United States Patent
Seregin et al.

(10) Patent No.: US 9,392,268 B2
(45) Date of Patent: Jul. 12, 2016

(54) USING BASE LAYER MOTION INFORMATION

(71) Applicant: QUALCOMM Incorporated, San Diego, CA (US)

(72) Inventors: Vadim Seregin, San Diego, CA (US); Xianglin Wang, San Diego, CA (US); Chengjie Tu, San Diego, CA (US); Ying Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 374 days.

(21) Appl. No.: 14/035,674

(22) Filed: Sep. 24, 2013

(65) Prior Publication Data

US 2014/0092967 A1    Apr. 3, 2014

Related U.S. Application Data

(60) Provisional application No. 61/707,803, filed on Sep. 28, 2012, provisional application No. 61/727,650, filed on Nov. 16, 2012.

(51) Int. Cl.
  *H04N 7/26* (2006.01)
  *H04N 19/105* (2014.01)
  (Continued)

(52) U.S. Cl.
  CPC ........ *H04N 19/00024* (2013.01); *H04N 19/105* (2014.11); *H04N 19/30* (2014.11); *H04N 19/52* (2014.11)

(58) Field of Classification Search
  CPC ..... H04N 19/52; H04N 19/70; H04N 19/105; H04N 19/56; H04N 19/187; H04N 19/53
  See application file for complete search history.

(56) References Cited

U.S. PATENT DOCUMENTS

| | | | |
|---|---|---|---|
| 2006/0153300 A1* | 7/2006 | Wang | H04N 19/56 375/240.16 |
| 2007/0019721 A1* | 1/2007 | Le Leannec | H04N 19/63 375/240.1 |

(Continued)

FOREIGN PATENT DOCUMENTS

| | | |
|---|---|---|
| WO | 2013069231 A1 | 5/2013 |
| WO | WO-2013109953 | 7/2013 |

OTHER PUBLICATIONS

Bross B., et al., "High Efficiency Video Coding (HEVC) text specification Working Draft 5," 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ), No. JCTVC-G1103-v7, Dec. 19, 2011, 213 pages, XP002711587.

(Continued)

*Primary Examiner* — Jay Patel
*Assistant Examiner* — Neil Mikeska
(74) *Attorney, Agent, or Firm* — Knobbe, Martens, Olson & Bear, LLP

(57) ABSTRACT

Systems, methods, and devices for coding video data are described herein. In some aspects, a memory is configured to store the video data associated with a base layer and an enhancement layer. The base layer may comprise a reference block and base layer motion information associated with the reference block. The enhancement layer may comprise a current block. A processor operationally coupled to the memory is configured to determine a position of the base layer motion information in a candidate list based on a prediction mode in a plurality of prediction modes used at the enhancement layer. The processor is further configured to perform a prediction of the current block based at least in part on the candidate list.

14 Claims, 10 Drawing Sheets

(51) Int. Cl.
*H04N 19/52* (2014.01)
*H04N 19/30* (2014.01)

(56) References Cited

U.S. PATENT DOCUMENTS

| | | | | |
|---|---|---|---|---|
| 2008/0056356 A1* | 3/2008 | Wang | H04N 19/105 | 375/240.12 |
| 2008/0089416 A1 | 4/2008 | Jeon | | |
| 2008/0101470 A1* | 5/2008 | Hong | H04N 21/242 | 375/240.14 |
| 2008/0260034 A1* | 10/2008 | Wang | H04N 19/52 | 375/240.16 |
| 2008/0267291 A1* | 10/2008 | Vieron | H04N 19/139 | 375/240.16 |
| 2009/0067502 A1* | 3/2009 | Jeon | H04N 19/105 | 375/240.16 |
| 2009/0168880 A1* | 7/2009 | Jeon | H04N 19/52 | 375/240.16 |
| 2009/0225846 A1* | 9/2009 | Francois | H04N 19/52 | 375/240.16 |
| 2010/0046622 A1* | 2/2010 | Doser | H04N 19/105 | 375/240.13 |
| 2010/0158127 A1* | 6/2010 | Kim | H04N 19/176 | 375/240.16 |
| 2011/0116549 A1* | 5/2011 | Sun | H04N 19/139 | 375/240.16 |
| 2011/0216833 A1* | 9/2011 | Chen | H04N 13/0022 | 375/240.16 |
| 2011/0243231 A1* | 10/2011 | Li | H04N 19/00672 | 375/240.16 |
| 2012/0236942 A1 | 9/2012 | Lin et al. | | |
| 2013/0077677 A1 | 3/2013 | Wang et al. | | |
| 2013/0089134 A1 | 4/2013 | Wang et al. | | |
| 2013/0107962 A1* | 5/2013 | Sim | H04N 19/105 | 375/240.16 |
| 2013/0107965 A1 | 5/2013 | Wahadaniah et al. | | |
| 2013/0114742 A1 | 5/2013 | Hannuksela et al. | | |
| 2013/0243093 A1 | 9/2013 | Chen et al. | | |
| 2013/0294513 A1* | 11/2013 | Seregin | H04N 19/52 | 375/240.14 |
| 2013/0336407 A1 | 12/2013 | Chen et al. | | |
| 2013/0343459 A1* | 12/2013 | Bici | H04N 19/00684 | 375/240.16 |
| 2014/0078254 A1* | 3/2014 | Lin | H04N 19/597 | 348/43 |
| 2014/0079131 A1* | 3/2014 | Sugio | H04N 19/56 | 375/240.16 |
| 2014/0086325 A1* | 3/2014 | Chen | H04N 19/52 | 375/240.14 |
| 2014/0086327 A1* | 3/2014 | Ugur | H04N 19/52 | 375/240.16 |
| 2014/0341291 A1* | 11/2014 | Schwarz | H04N 19/597 | 375/240.16 |
| 2015/0049806 A1* | 2/2015 | Choi | H04N 19/597 | 375/240.12 |
| 2015/0071356 A1* | 3/2015 | Kim | H04N 19/513 | 375/240.16 |
| 2015/0229967 A1* | 8/2015 | Lee | H04N 19/30 | 375/240.02 |
| 2015/0271519 A1* | 9/2015 | Sugio | H04N 19/51 | 375/240.16 |
| 2015/0334411 A1* | 11/2015 | Yamamoto | H04N 19/513 | 375/240.16 |

OTHER PUBLICATIONS

Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Document No. JCTVC-K1003_v13, Oct. 10-19, 2012, 317 pp.

Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, CH, Document No. JCTVC-G1103_d4, Nov. 21-30, 2011, 219 pp.

Chen Y., et al., "AHG10: Motion related hooks for HEVC multiview/3DV extension based on long-term reference pictures", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16 ), No. JCTVC-J0121, Jul. 3, 2012, XP030112483; 8 pages.

Hannuksela M.M., et al., "AHG21: Removal of reference picture list modification", 99. MPEG Meeting; Feb. 6, 2012-Feb. 10, 2012; San Josa CR; (Motion Picture Expert Group or ISO/IEC JTC1/SC29/WG11), No. m23302, Feb. 3, 2012, XP030051827; 10 pages.

ITU-T H.264, Series H: Audiovisual and Multimedia Systems, Infrastructure of audiovisual services—Coding of moving video, Advanced video coding for generic audiovisual services, Mar. 2005, 343 pages.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

Reply to Second Written Opinion mailed Jul. 4, 2014, from international application No. PCT/US2013/045922, dated Sep. 2, 2014, 29 pp.

Reply to Written Opinion mailed Sep. 17, 2013, from international application No. PCT/US2013/045922, dated Apr. 15, 2014, 34 pp.

Schwarz H., et al., "Test Model under Consideration for HEVC based 3D video coding v3.0", 100. MPEG Meeting; Apr. 30, 2012-May 4, 2012; Geneva; (Motion Picture Expert Group or ISO/IEC JTC1/SC29/WG11), No. N12744, Jun. 1, 2012, XP030019217, pp. 1-46.

Second Written Opinion of international application No. PCT/US2013/045922, mailed Jul. 4, 2014, 8 pp.

Boyce J. et al., "Information for HEVC scalability extension", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G078, Nov. 8, 2011, XP030110062; pp. 1-7.

Chen J., et al., "Description of scalable video coding technology proposal by Qualcomm (configuration 1)", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/,No. JCTVC-K0035, Oct. 2, 2012, XP030112967, pp. 1-19.

Hong D et al: "Scalability Support in HEVC", 97. MPEG Meeting; Jul. 18, 2011-Jul. 22, 2011; Torino; (Motion Picture Expert Group or ISO/IEC JTC1/SC29/WG11) No. m20710. Jul. 13, 2011 XP030049273, pp. 1-15.

International Search Report and Written Opinion—PCT/US2013/061674—ISA/EPO—Dec. 3, 2013.

Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, pp. 290.

(56) References Cited

OTHER PUBLICATIONS

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012] 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010; pp. 137.

Chiu Y.J., "TE C5: Crosscheck for 5.2.7 on EL AMVP mode (JCTVC-L0164)," JCTVC-L0310, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 2 Pages.

Francois E., "Cross-check of TE5 proposal JCTVC-L0205 on Using base layer MV in Merge and AMVP modes," JCTVC-L0432, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 1 Page.

Seregin V., "TE5: Using base layer MV in Merge and AMVP modes (test 5.2.2)," JCTVC-L0205, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 3 Pages.

\* cited by examiner

USING BASE LAYER MOTION INFORMATION

CROSS-REFERENCE TO RELATED APPLICATIONS

This application claims priority to U.S. Provisional Patent Application No. 61/707,803, entitled "USING BASE LAYER MOTION INFORMATION" and filed on Sep. 28, 2012, and U.S. Provisional Patent Application No. 61/727,650, entitled "MERGE LIST CONSTRUCTION WITHOUT TEMPORAL MOTION VECTOR PREDICTOR" and filed on Nov. 16, 2012, the entire contents of which disclosures are herewith incorporated by reference.

TECHNICAL FIELD

This disclosure is related to the field of video coding and compression. More particularly, this disclosure relates to scalable video coding (SVC).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information by implementing such video coding techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which may be quantized. The quantized transform coefficients may be initially arranged in a two-dimensional array and scanned in order to produce a one-dimensional vector of transform coefficients, and entropy coding may be applied to achieve even more compression.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of the disclosure provides an apparatus configured to code video data. The apparatus comprises a memory configured to store video data associated with a base layer and an enhancement layer. The base layer may comprise a reference block and base layer motion information associated with the reference block. The enhancement layer may comprise a current block. The apparatus further comprises a processor operationally coupled to the memory and configured to determine a position of the base layer motion information in a candidate list based on a prediction mode in a plurality of prediction modes used at the enhancement layer. The processor is further configured to perform a prediction of the current block based at least in part on the candidate list.

Another aspect of the disclosure provides a method for decoding video data. The method comprises receiving syntax elements extracted from an encoded video bit stream. The method further comprises determining a candidate list for prediction of a current block based on the syntax elements. The video data may comprise a base layer and an enhancement layer. The enhancement layer may comprise a current block. The base layer may comprise a reference block and base layer motion information associated with the reference block. The method further comprises determining a position of the base layer motion information in a candidate list based on a prediction mode in a plurality of prediction modes used at the enhancement layer. The method further comprises performing a prediction of the current block based at least in part on the candidate list.

Another aspect of the disclosure provides a non-transitory computer-readable medium having stored thereon code that, when executed, causes an apparatus to determine a candidate list for prediction of a current block. The video data may comprise a base layer and an enhancement layer. The enhancement layer may comprise a current block. The base layer may comprise a reference block and base layer motion information associated with the reference block. The medium further comprises code that, when executed, causes an apparatus to determine a position of the base layer motion information in a candidate list based on a prediction mode in a plurality of prediction modes used at the enhancement layer. The medium further comprises code that, when executed, causes an apparatus to perform a prediction of the current block based at least in part on the candidate list.

Another aspect of the disclosure provides a video coding device that codes video data. The video coding device comprises means for determining a candidate list for prediction of a current block. The video data may comprise a base layer and an enhancement layer. The enhancement layer may comprise a current block. The base layer may comprise a reference block and base layer motion information associated with the reference block. The video coding device further comprises means for determining a position of the base layer motion information in a candidate list based on a prediction mode in a plurality of prediction modes used at the enhancement layer. The video coding device further comprises means for performing a prediction of the current block based at least in part on the candidate list.

DETAILED DESCRIPTION

Figure 1:
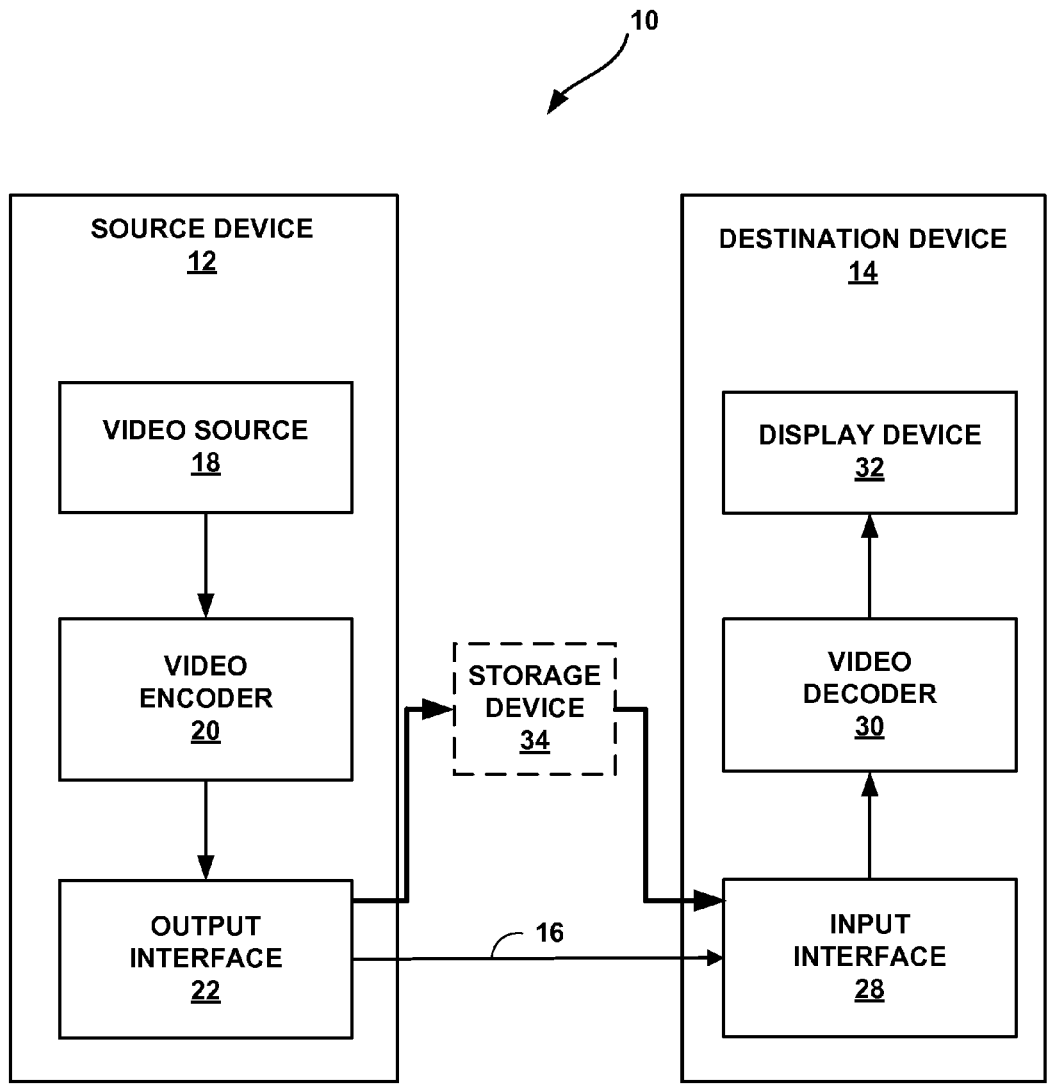
FIG. 1 is a block diagram of an illustrative video encoding and decoding system that may utilize the techniques of this disclosure.

The techniques described in this disclosure are generally related to scalable video coding (SVC). For example, the techniques may be related to, and used with or within, a High Efficiency Video Coding (HEVC) scalable video coding (SVC) extension. In SVC, there can be multiple layers. A layer at the very bottom level or lowest level may serve as a base layer (BL), and the layer at the very top may serve as an enhanced layer (EL). The "enhanced layer" may be considered as being synonymous with an "enhancement layer," and these terms may be used interchangeably. Layers between the BL and EL may serve as either or both ELs or BLs. For instance, a layer may be an EL for the layers below it, such as the base layer or any intervening enhancement layers, and also serve as a BL for an enhancement layers above it.

For purposes of illustration, the techniques described in the disclosure are described using examples where there are only two layers. One layer can include a lower level layer or reference layer, and another layer can include a higher level layer or enhancement layer. For example, the reference layer can include a base layer or a temporal reference on an enhancement layer, and the enhancement layer can include an enhanced layer relative to the reference layer. It should be understood that the examples described in this disclosure extend to multiple enhancement layers as well.

Video coding standards can include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its SVC and Multiview Video Coding (MVC) extensions. A draft of MVC is described in "Advanced video coding for generic audiovisual services," ITU-T Recommendation H.264, March 2010. In addition, HEVC is currently being developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 7" is in document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. This document is herein incorporated by reference in its entirety.

As described above, in SVC there can be multiple layers (e.g., BL and EL). In some implementations, information from a block in a BL can be used to encode or decode a block in the EL. For example, two modes, Merge mode Advanced Motion Vector Prediction (AMVP) mode, which are described in greater detail below, can use information from the BL block to encode or decode a block in the EL. In existing implementations, the information from the BL block is used in the same way in both Merge mode and AMVP mode.

However, when designing extensions for HEVC, it may be desirable to make as few changes to the existing HEVC framework as possible. For example, designing an extension such that the information from the BL block is used in a certain way in Merge mode may not require many changes to the existing HEVC framework. On the other hand, designing an extension such that the information from the BL block is used in the same way in AMVP mode may require several changes to the existing HEVC framework. Accordingly, the techniques disclosed herein are directed to extensions that use information from the BL block when performing the encoding or decoding of a block in the EL while minimizing the number of changes made to the existing HEVC framework.

FIG. 1 is a block diagram illustrating an example video encoding and decoding system that may utilize techniques in accordance with aspects described in this disclosure. As shown in FIG. 1, system 10 includes a source device 12 that can provide encoded video data to be decoded by a destination device 14. In particular, source device 12 can provide the video data to destination device 14 via a computer-readable medium 16. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, video streaming device, or the like. Source device 12 and destination device 14 may be equipped for wireless communication.

Destination device 14 may receive the encoded video data to be decoded via computer-readable medium 16. Computer-readable medium 16 may comprise a type of medium or device capable of moving the encoded video data from source device 12 to destination device 14. For example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to an optional storage device 34. Similarly, encoded data may be accessed from the storage device 34 by input interface 28. The storage device 34 may include any of a variety of distributed or locally accessed data storage media, such as a hard drive, Blu-ray discs, DVDs, CD-ROMs, flash memory, volatile or non-volatile memory, or other digital storage media for storing video data. The storage device 34 may correspond to a file server or another intermediate storage device that may store the encoded video generated by source device 12. Destination device 14 may access stored video data from the storage device 34 via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device 34 may be a streaming transmission, a download transmission, or a combination thereof.

The techniques of this disclosure can apply to applications or settings in addition to wireless applications or settings. The techniques may be applied to video coding in support of a variety of multimedia applications, such as over-the-air television broadcasts, cable television transmissions, satellite television transmissions, Internet streaming video transmissions (e.g., dynamic adaptive streaming over HTTP (DASH)), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 34 for later access by destination device 14 or other devices, for decoding and/or playback.

Destination device 14 includes input interface 28, video decoder 30, and display device 32. In some cases, input interface 28 may include a receiver and/or a modem. Input interface 28 of destination device 14 receives the encoded video data over link 16. The encoded video data communicated over link 16, or provided on storage device 34, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device.

Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

System 10 of FIG. 1 is one example system, and techniques for determining candidates for a candidate list for motion vector predictors for a current block may be performed by other digital video encoding and/or decoding devices. Although generally the techniques of this disclosure can be performed by a video encoding device, the techniques can be performed by a combined video encoder/decoder, typically referred to as a "CODEC." Moreover, the techniques of this disclosure can be performed by a video preprocessor. Source device 12 and destination device 14 are examples of such coding devices in which source device 12 generates coded video data for transmission to destination device 14. In some embodiments, devices 12 and 14 may operate in a substantially symmetrical manner such that each of devices 12 and 14 include video encoding and decoding components. Hence, system 10 may support one-way or two-way video transmission between video devices 12 and 14 (e.g., for video streaming, video playback, video broadcasting, or video telephony).

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a computer-readable medium 16.

Computer-readable medium 16 may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, computer-readable medium 16 may be understood to include one or more computer-readable media of various forms.

Input interface 28 of destination device 14 can receive information from computer-readable medium 16. The information of computer-readable medium 16 may include syntax information defined by video encoder 20, which can be used by video decoder 30, that includes syntax elements that describe characteristics and/or processing of blocks and other coded units (e.g., a group of pictures (GOPs)). Display device 32 displays the decoded video data to a user, and may include any of a variety of display devices, such as a cathode ray tube (CRT), a liquid crystal display (LCD), a plasma display, a light emitting diode (LED) display, an organic light emitting diode (OLED) display, or another type of display device.

Video encoder 20 and video decoder 30 may operate according to a video coding standard, such as the HEVC standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a CODEC in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device, referred to as the HM. The HM presumes several additional capabilities of video coding devices relative to existing devices according to, for example, the ITU-T H.264/AVC standard. For example, whereas H.264 provides nine intra-prediction encoding modes, the HM may provide as many as thirty-three intra-prediction encoding modes.

In general, the working model of the HM describes that a video sequence includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU, which is described in greater detail below. The video blocks may have fixed or varying sizes, and may differ in size according to a specified coding standard.

In this disclosure, "N×N" and "N by N" may be used interchangeably to refer to the pixel dimensions of a video block in terms of vertical and horizontal dimensions (e.g., 16×16 pixels or 16 by 16 pixels). In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. As used herein, the term "block" refers to any of a CU, PU, or TU, in the context of HEVC, or similar data structures in the context of other standards (e.g., macroblocks and sub-blocks thereof in H.264/AVC). In addition, as used herein, the term "video block" refers to a coding node of a CU. In some specific cases, this disclosure may also use the term "video block" to refer to a treeblock (e.g., an LCU, or a CU that includes a coding node and PUs and TUs).

A video frame or picture may be divided into a sequence of treeblocks (e.g., coding trees or LCUs) that include both luma and chroma coding blocks. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into CUs according to a quadtree (e.g., each treeblock may be split into four CUs). A CU may be formed from a luma coding block, two chroma coding blocks, and associated syntax data. In general, a quadtree data structure includes one node per CU, with a root node corresponding to the treeblock. If a CU is split into four sub-CUs, the node corresponding to the CU includes four leaf nodes, each of which corresponds to one of the sub-CUs. Thus, a treeblock may be split into four child nodes (e.g., CUs), and each child node may in turn be a parent node and be split into another four child nodes (e.g., sub-CUs).

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split. Syntax data associated with a coded bitstream may define a maximum number of times a treeblock may be split (referred to as a maximum CU depth) and may also define a minimum size of the coding nodes (referred to as a smallest coding unit (SCU)).

A CU has a similar purpose as a MB of the H.264 standard, except that a CU does not have a size distinction. A CU includes a coding node. A size of the CU corresponds to a size of the coding node and must be square in shape. The size of the CU may range from 8×8 pixels up to the size of the treeblock, with a maximum of 64×64 pixels or greater.

Each leaf-CU may contain one or more PUs and one or more TUs. A PU describes a partition of a CU for the prediction of pixel values. Syntax data associated with a CU may describe, for example, partitioning of the CU into one or more PUs. Partitioning modes may differ between whether the CU is skip or direct mode encoded, intra-prediction mode encoded, or inter-prediction mode encoded. A PU may be square or non-square (e.g., rectangular) in shape.

In general, a PU represents a spatial area corresponding to all or a portion of the corresponding CU, and may include data for retrieving a reference sample for the PU. Moreover, a PU includes data related to the prediction process. For example, when the PU is intra-mode encoded, data for the PU may be included in a residual quadtree (RQT). The RQT may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

Following intra-predictive or inter-predictive coding using the PUs of a CU, video encoder 20 may calculate residual data for the TUs of the CU. The residual data may correspond to pixel differences between pixels of the unencoded (e.g., original) picture and prediction values corresponding to the PUs. A TU represents the units of a CU that are spatially transformed using a transform (e.g., a discrete cosine transform (DCT), an integer transform, a wavelet transform, or a conceptually similar transform). Syntax data associated with a CU may describe, for example, partitioning of the CU into one or more TUs. In some aspects, the CU may be partitioned into one or more TUs according to a quadtree. A TU may be square or non-square (e.g., rectangular) in shape.

The TUs may be specified using an RQT (also referred to as a TU quadtree structure), as discussed above. For example, a split flag may indicate whether a leaf-CU is split into four TUs. Then, each TU may be split further into sub-TUs. When a TU is not split further, it may be referred to as a leaf-TU.

Generally, for intra coding, all the leaf-TUs belonging to a leaf-CU share the same intra-prediction mode. That is, the same intra-prediction mode is generally applied to calculate predicted values for all TUs of a leaf-CU. For intra coding, video encoder 20 may calculate residual data for each leaf-TU using the intra-prediction mode. A TU is not necessarily limited to the size of a PU. Thus, a TU may be the same size, larger, or smaller than a PU. For intra coding, a PU may be co-located with a corresponding leaf-TU for the same CU. In some examples, the maximum size of a leaf-TU may correspond to the size of the corresponding leaf-CU.

As described above, the PUs may comprise syntax data describing a method or mode of generating predictive pixel data in the spatial domain (also referred to as the pixel domain). In addition, the TUs may comprise coefficients in the transform domain once a transform as described above is applied to the calculated residual data. For example, video encoder 20 may form the TUs by including the residual data, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector (e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology). Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and/or GOP-based syntax data, to video decoder 30 (e.g., in a frame header, a block header, a slice header, or a GOP header). The GOP-based syntax data may describe a number of frames in the respective GOP, and the frame-based syntax data may indicate an encoding/prediction mode used to encode the corresponding frame.

In accordance with the techniques of this disclosure, source device 12 and destination device 14 may be configured to receive original, non-downsampled information for a lower level layer block (e.g., a BL block), and predict information for a higher level layer block (e.g., an EL block) based on the original, non-downsampled information for the lower level layer block. In some examples, after predicting the information for the higher level layer block, source device 12 may downsample the information for the lower level layer block.

Source device 12 and destination device 14 may determine a location of a sub-block within the lower level layer block, and derive information from the sub-block within the lower level block. In this example, source device 12 and destination device 14 may predict information for the higher level layer block based on the derived information. The information may be motion information, intra-prediction mode, or other types of information (e.g., non-image information associated with blocks). The motion information may include a motion vector, a reference index, inter direction information, and/or the like.

The emerging HEVC working draft (WD) may be considered in view of the above discussion of H.264/AVC. In the HEVC WD, there are two modes for the prediction of motion parameters. One mode may be referred to as a "Merge mode," while the other mode may be referred to as an "advanced motion vector prediction" mode or "AMVP mode."

The Merge mode is similar to the AMVP mode, except that motion information for the current block may be inferred from motion information of neighboring or temporal blocks. In other words, Merge mode is a video coding mode in which motion information (e.g., motion vectors, reference frame indexes, prediction directions, or other information) of a neighboring or temporal video block are inherited for a current video block being coded. When Merge mode is utilized, a merge list is constructed based upon information associated with various video blocks spatially and temporally neighboring a current video block that is being coded (e.g., encoded or decoded). The merge list typically includes a predetermined number of entries. For example, in HEVC, the merge list typically includes no more than five entries. Unlike in the AMVP mode, the reference index may not be signaled by the source device 12 in the Merge mode. Rather, one of five neighbors in the merge list may provide the motion information: a left top neighbor (e.g., the top-most left neighbor, also referred to as the left neighbor), a top left neighbor (e.g., the left-most top neighbor, also referred to as the top neighbor), a top right neighbor (e.g., the right-most top neighbor), a bottom left neighbor (e.g., the bottom-most left neighbor), or co-located block from a temporally adjacent frame (e.g., a block co-located with the center of the current block). A flag or index value may be used to identify the block from which the current block inherits its motion information (e.g., top neighbor, top right neighbor, left neighbor, left bottom neighbor, or co-located block from a temporally adjacent frame).

In the AMVP mode, a list of motion vector predictors is created from spatial and/or temporal neighbors of a block that can be used for motion prediction. In other words, in motion vector prediction, the motion vector of a neighboring video block is used in the coding of a current video block. For example, blocks that spatially neighbor the current block to the top and to the left may provide motion vector predictors for the list. In addition, a co-located block that temporally neighbors the current block may also provide a motion vector predictor for the list. In some embodiments, predictive coding of motion vectors is applied to reduce the amount of data needed to communicate the motion vector. For example, rather than encoding and communicating the motion vector itself, the encoder encodes and communicates a motion vector difference (MVD) relative to a known (or knowable) motion vector. AMVP allows for many possible candidates for defining the MVD. In other embodiments, the predictors may be motion vectors from the spatial and/or temporal neighbors.

In an embodiment, both Merge and AMVP modes build a candidate list for reference picture list zero (e.g., RefPicList0 or List 0) and a candidate list for reference picture list one (e.g., RefPicList1 or List 1). In some embodiments, the Merge and/or AMVP modes also build a candidate list for reference picture list c (e.g., RefPicListC or List C). Each of these reference picture lists may be used for uni-directional or bi-directional prediction and specify a list of potential pictures or frames used for performing temporal and/or spatial motion prediction.

A candidate of AMVP to be used for the coding of motion parameters are from spatial and temporal neighboring blocks. In the AMVP mode, the reference index values are signaled. In an embodiment, in the AMVP mode, a first list (e.g., RefPicList0 or List 0) may include motion vector predictors from spatial neighbors to the top, a second list (e.g., RefPicList1 or List 1) may include motion vector predictors from spatial neighbors to the left, and a third list (e.g., RefPicListC or List C) may include a motion vector predictor from a temporal neighbor.

In an embodiment, in the AMVP mode, the source device 12 (e.g., the motion estimation unit 42 of the video encoder 20, as described below with respect to FIG. 2) may select one motion vector predictor from a block in the group of blocks that spatially neighbor the current block to the top based on motion information. For example, the motion vector predictor of a block may be chosen if the motion vector in the block points to the same reference picture as the current block. If all the blocks in the group have been analyzed and none of the motion vectors point to the same reference picture as the current block, the motion vector of the last block analyzed may be scaled. The motion vector may be scaled based on the picture order count (POC) distance between the current picture and the reference picture of the last analyzed block and the POC distance between the current picture and the reference picture of the current block. The source device 12 may select one motion vector predictor of a block in the group of blocks that spatially neighbor the current block to the left in the same manner. Once a motion predictor vector has been selected from the group of blocks that spatially neighbor the current block to the top and from the group of blocks that spatially neighbor the current block to the left, the source device 12 (e.g., the video encoder 20) may then select one of the final three motion vector predictors (e.g., the motion vector predictor from the block that spatially neighbors the current block to the top, the motion vector predictor from the block that spatially neighbors the current block to the left, and the motion vector predictor from the block that temporally neighbors the current block). A reference index may be signaled (e.g., transmitted by the source device 12 via the computer-readable medium 16 or included in the encoded video bitstream as described below) to indicate which of the final three motion vector predictors was selected and that should be used when decoding. If one of the three motion vector predictors is not available (e.g., because the neighboring blocks are intra-coded, and thus have no motion information), then the source device 12 chooses from fewer than three motion vector predictors.

In the Merge mode, reference index values are not signaled since the current PU shares the reference index values of the chosen candidate motion vector predictor. In some instances, the Merge mode may be implemented such that only one candidate list is created.

In the Merge mode, individual motion parameters are transmitted for each inter PU. In order to achieve a potentially improved coding efficiency, the block merging process is utilized to select the best motion vector predictor in a so-called Merge mode.

Figure 2:
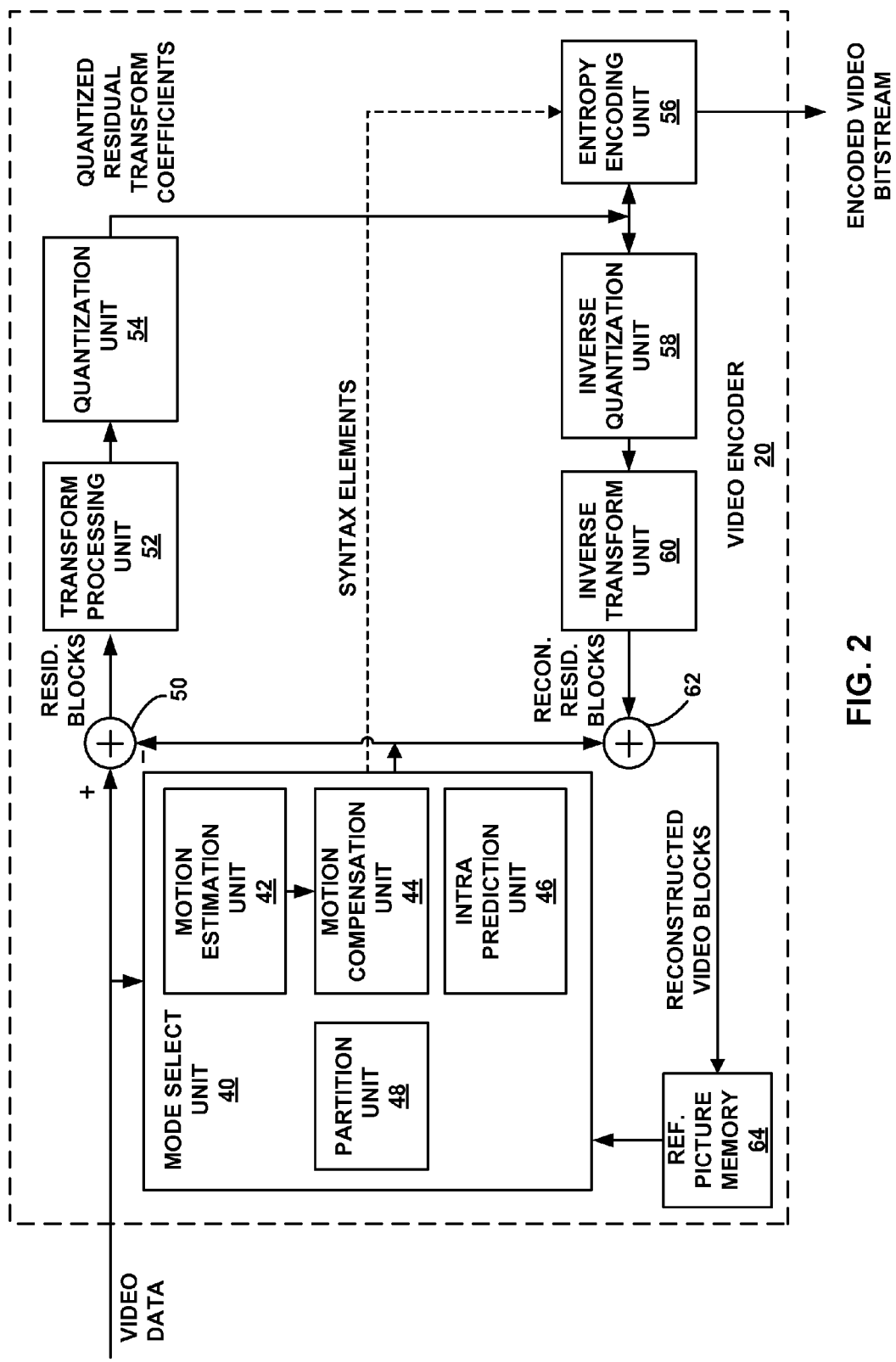
FIG. 2 is a block diagram of an illustrative video encoder that may implement techniques of this disclosure.

FIG. 2 is a block diagram illustrating an example of a video encoder that may implement techniques in accordance with aspects described in this disclosure. Video encoder 20 may be configured to perform any or all of the techniques of this disclosure. For example, mode select unit 40 (e.g., motion estimation unit 42) may be configured to insert motion information from a BL into a specific slot in a candidate list based on the mode being used, as described in greater detail below. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as urn-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion estimation unit 42, motion compensation unit 44, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes (e.g., to select an appropriate coding mode for each block of video data).

Moreover, partition unit 48 may partition blocks of video data into sub-blocks, based on an evaluation of previous partitioning schemes in previous coding passes. For example, partition unit 48 may initially partition a frame or slice into LCUs, and partition each of the LCUs into sub-CUs based on a rate-distortion analysis (e.g., rate-distortion optimization). Mode select unit 40 (e.g., partition unit 48) may further produce a quadtree data structure indicative of partitioning of an LCU into sub-CUs. As described above, leaf-CUs of the quadtree may include one or more PUs and one or more TUs.

Mode select unit 40 may select one of the coding modes (e.g., intra or inter) based on error results, and provide the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 can be highly integrated, but are illustrated separately for conceptual purposes. Motion estimation or the prediction of motion information, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (e.g., List 0), a second reference picture list (e.g., List 1), or a third reference picture list (e.g., List C), each of which identify one or more reference pictures stored in reference picture memory 64. As described above, the reference picture may be selected based on the motion information of blocks that spatially and/or temporally neighbor the PU. The selected reference picture may be identified by a reference index. In addition, the motion estimation unit 42 determines candidates for a Merge mode and/or an AMVP candidate list (e.g., BL motion information, as described in greater detail below), including the order in which candidates are presented in the list (e.g., the order of the reference pictures in the reference picture lists). Motion estimation unit 42 sends the calculated motion vector and/or the reference index to entropy encoding unit 56 and/or motion compensation unit 44.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, in some embodiments. In particular, intra-prediction unit 46 may determine an intra-prediction mode to use to encode a current block. In some examples, intra-prediction unit 46 may encode a current block using various intra-prediction modes (e.g., during separate encoding passes) and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

As described above, video encoder 20 forms a residual video block by subtracting the prediction data provided by mode select unit 40 from the original video block being coded. Summer 50 represents the component or components that perform this subtraction operation. Transform processing unit 52 applies a transform, such as a DCT or a conceptually similar transform (e.g., wavelet transforms, integer transforms, sub-band transforms, etc.), to the residual block, producing a video block comprising residual transform coefficient values. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform CAVLC, CABAC, SBAC, PIPE coding, or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames stored in reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Figure 3:
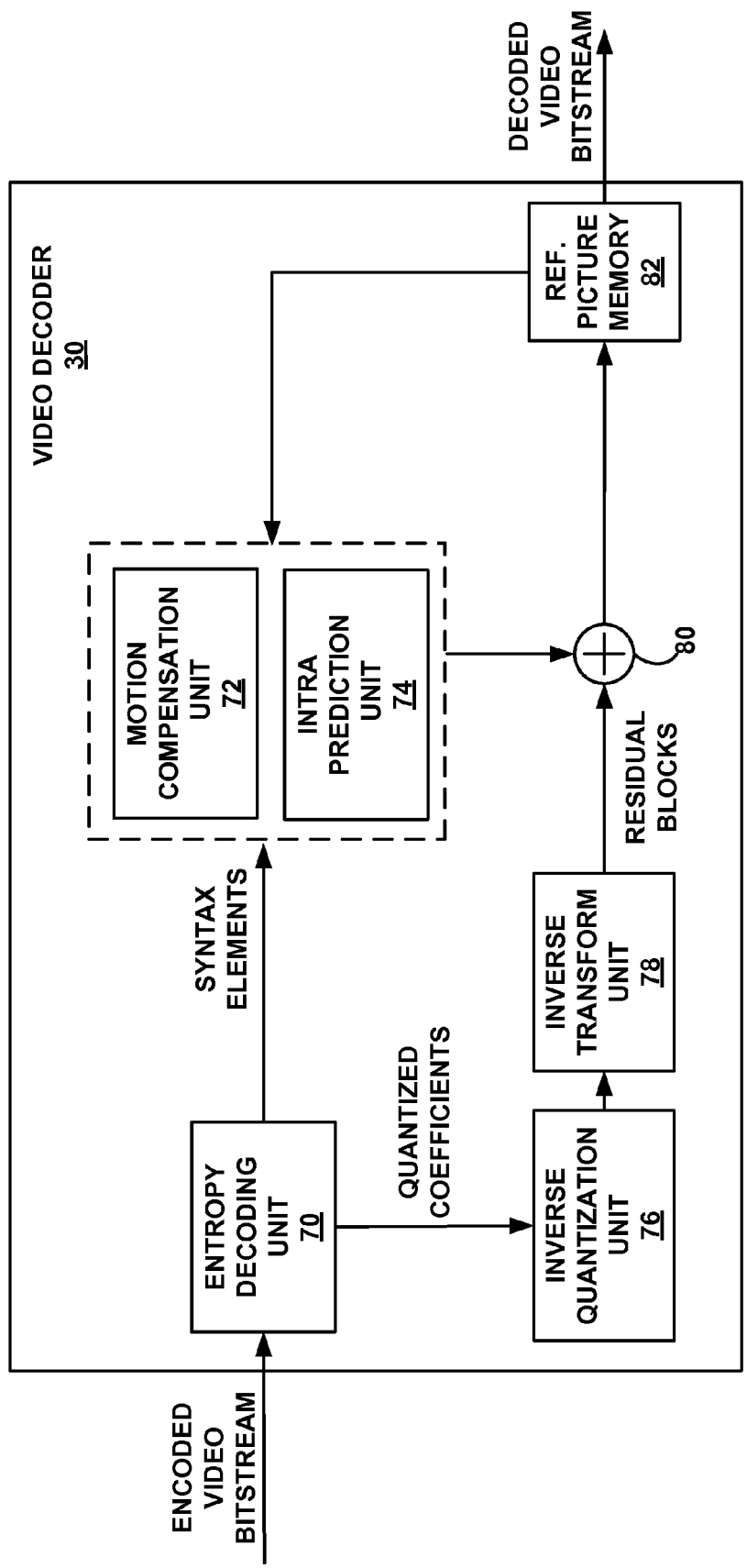
FIG. 3 is a block diagram of an illustrative video decoder that may implement techniques of this disclosure.

FIG. 3 is a block diagram illustrating an example of a video decoder that may implement techniques in accordance with aspects described in this disclosure. Video decoder 30 may be configured to perform any or all of the techniques of this disclosure. For example, the motion compensation unit 72 may be configured to insert motion information from a BL into a specific slot in a candidate list based on the mode being used, as described in greater detail below. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference picture memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and/or other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 (e.g., the motion compensation unit 72) may construct the reference picture lists, List 0, List 1, and/or List C, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and/or other information to decode the video blocks in the current video slice. In addition, the motion compensation unit 72 determines candidates for a Merge mode and/or an AMVP candidate list (e.g., BL motion information, as described in greater detail below), including the order in which candidates are presented in the list (e.g., the order of the reference pictures in the reference picture lists), if inter-prediction is used to code the video blocks.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes (e.g., de-quantizes) the quantized transform coefficients provided in the bitstream and decoded by entropy decoding unit 70. The inverse quantization process may include use of a quantization parameter $QP_Y$ calculated by video encoder 20 for each video block in the video slice to determine a degree of quantization and, likewise, a degree of inverse quantization that should be applied.

Inverse transform unit 78 applies an inverse transform (e.g., an inverse DCT), an inverse integer transform, or a conceptually similar inverse transform process, to the transform coefficients in order to produce residual blocks in the pixel domain.

In some cases, inverse transform unit 78 may apply a 2-dimensional (2-D) inverse transform (in both the horizontal and vertical direction) to the coefficients. According to the techniques of this disclosure, inverse transform unit 78 may instead apply a horizontal 1-D inverse transform, a vertical 1-D inverse transform, or no transform to the residual data in each of the TUs. The type of transform applied to the residual data at video encoder 20 may be signaled to video decoder 30 to apply an appropriate type of inverse transform to the transform coefficients.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Figure 4:
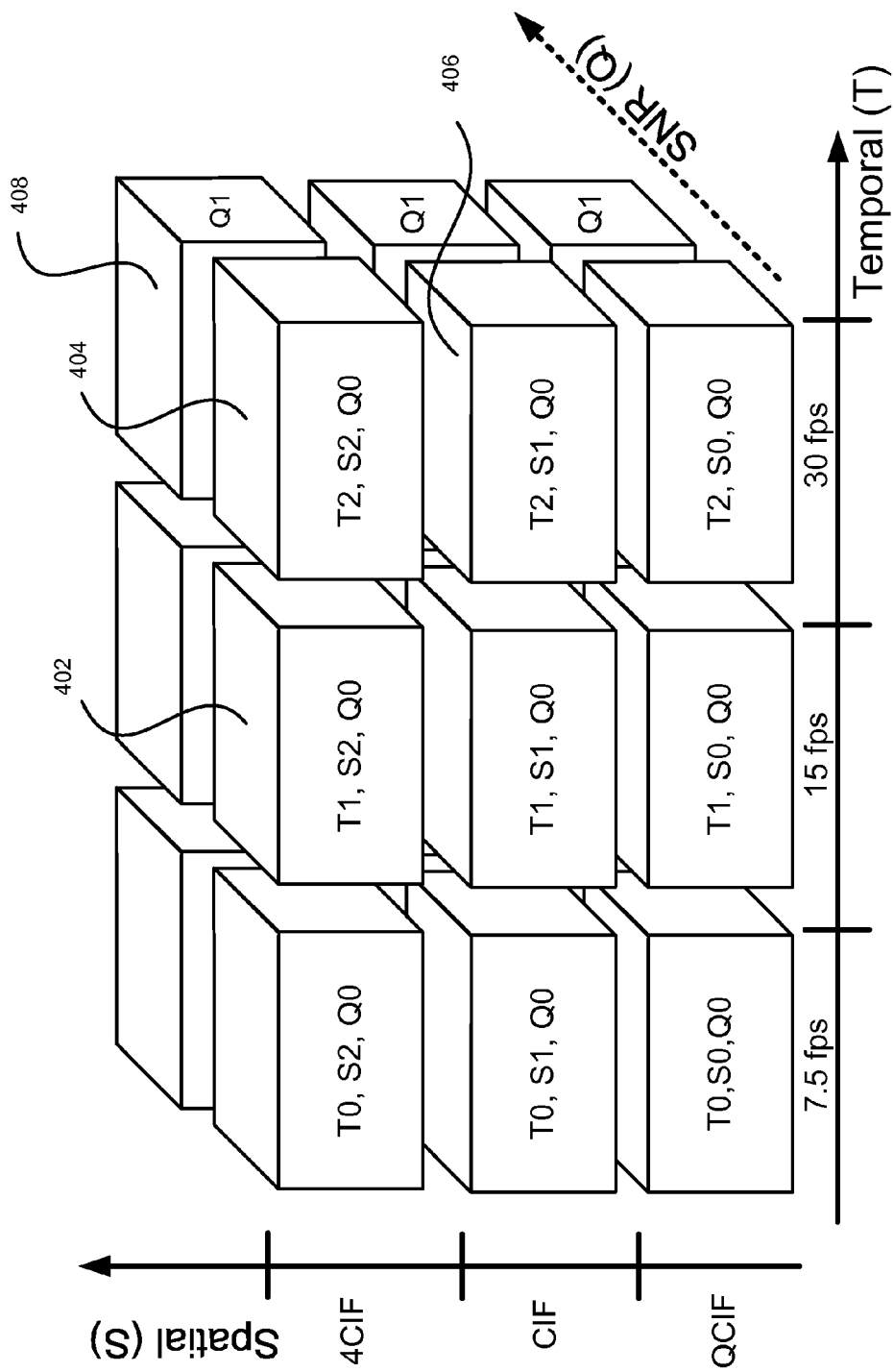
FIG. 4 is a conceptual diagram showing illustrative video scalabilities in different dimensions.

FIG. 4 is a conceptual diagram showing example scalabilities in different dimensions. The scalabilities shown are enabled in three dimensions: spatial, temporal, and signal-to-noise. In the temporal dimension illustrated in FIG. 4, frame rates with 7.5 Hz, 15 Hz or 30 Hz can be supported by temporal scalability (T). When spatial scalability (S) is supported, different video resolutions such as QCIF, CIF, 4CIF, or other resolutions may be enabled. For each specific spatial resolution and frame rate, the SNR (Q) layers can be added to improve the picture quality. SNR scalability is also referred as quality scalability. Once video content has been encoded in such a scalable way, an extractor tool may be used to adapt the actual delivered content according to application requirements, which are dependent, for example, on the clients or the transmission channel, or other device or environmental characteristics.

In the example shown in FIG. 4, each cube contains the pictures with the same frame rate (temporal layer), spatial resolution (spatial layer) and SNR (quality layer). For example, cubes 402 and 404 contain pictures with the same resolution and SNR, but different frame rates. Cubes 402 and 408 are only in the same spatial layer; cubes 402 and 408 have the same resolution but different frame rates and SNRs. Cubes 402 and 406 are only in the same quality layer; they have the same SNR, but different frame rates and resolutions.

Better representation can be achieved by adding those cubes (pictures) in any dimension. Combined scalability is supported when there are two, three, or even more scalabilities enabled. For example, by combining the pictures in cubes 402 with those in 404, a higher frame rate may be realized. By combining the pictures in cubes 404 with those in 408, a better SNR may be realized.

In some scalable video coding systems, the pictures with the lowest spatial and quality layer may be compatible with H.264/AVC. The pictures at the lowest temporal level form the temporal base layer, which can be enhanced with pictures at higher temporal levels. In addition to the H.264/AVC compatible layer, several spatial and/or SNR enhancement layers can be added to provide spatial and/or quality scalabilities. Each spatial or SNR enhancement layer itself may be temporally scalable, with the similar temporal scalability structure as the H.264/AVC compatible layer. For one spatial or SNR enhancement layer, the lower layer it depends on is also referred as the base layer of that specific spatial or SNR enhancement layer.

Figure 5:
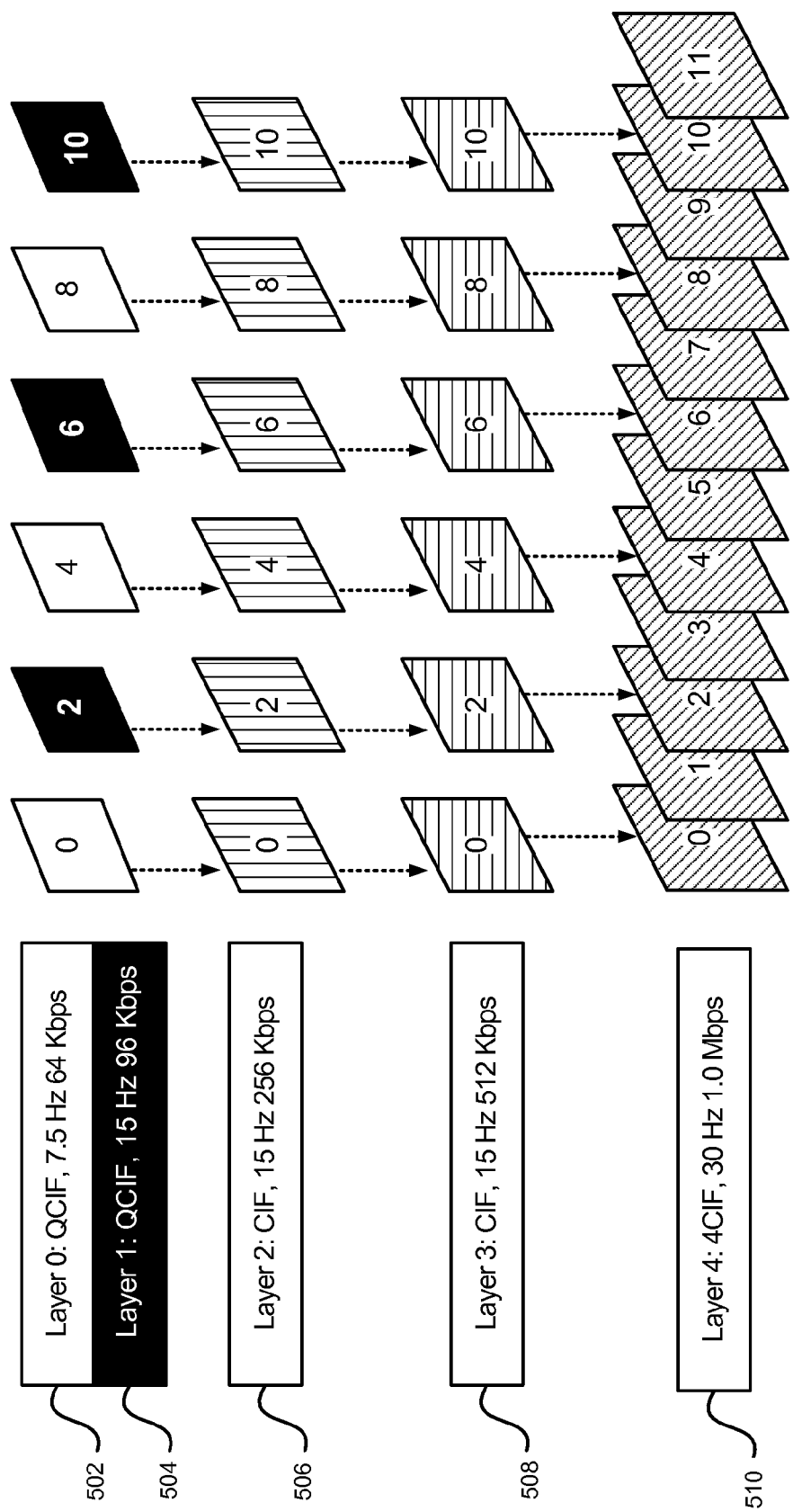
FIG. 5 is a conceptual diagram showing an illustrative scalable video coded bitstream.

FIG. 5 is a conceptual diagram showing an example scalable video coded bitstream. In the example coding structure shown, the pictures with the lowest spatial and quality layers (pictures in base layer 502 and enhancement layer 504, which provide QCIF resolution) are compatible with H.264/AVC. Among them, those pictures of the lowest temporal level form the temporal base layer 502. This temporal base layer 502 can be enhanced with pictures of higher temporal levels, such as enhancement layer 504. In addition to the H.264/AVC compatible layer 502, several spatial and/or SNR enhancement layers can be added to provide spatial and/or quality scalabilities. For instance, enhancement layer 506 in the example can be added. Enhancement layer 506 may be a CIF representation with the same resolution. Additional enhancement layers may also be added, such as enhancement layers 508 and 510. In the example, enhancement layer 508 may be an SNR enhancement layer. As shown in the example, each enhancement layer (e.g., a spatial or SNR enhancement layer) itself may be temporally scalable, with the same temporal scalability structure as the H.264/AVC compatible layer. Also, an enhancement layer can enhance both spatial resolution and frame rate. For example, enhancement layer 510 provides a 4CIF enhancement layer, which further increases the frame rate from 15 Hz to 30 Hz.

Figure 6:
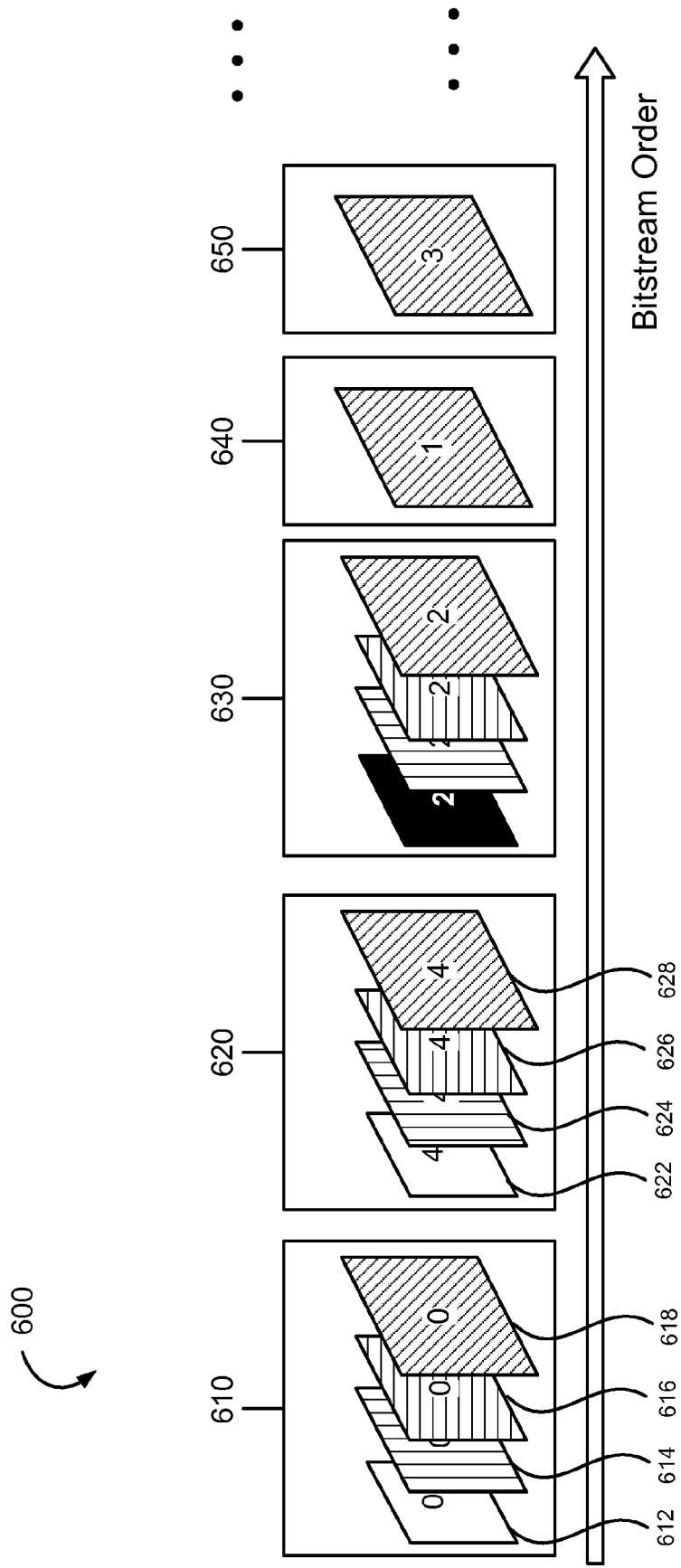
FIG. 6 is a conceptual diagram of illustrative access units in a scalable video coded bitstream.

FIG. 6 is a conceptual diagram showing example access units in a scalable video coded bitstream 600. In some embodiments, as shown, the coded layers in the same time instance are successive in the bitstream order and form one access unit in the context of SVC. Those SVC access units then follow the decoding order, which could be different from the display order and decided e.g., by the temporal prediction relationship. For example, an access unit 610 consisting of all four layers 612, 614, 616, and 618 for frame 0 (e.g., for frame 0 as illustrated in FIG. 5) may be followed by an access unit 620 consisting of all four layers 622, 624, 626, 628 for frame 4 (e.g., for frame 4 in FIG. 5). An access unit 630 for frame 2 may follow out-of-order, at least from a video playback perspective. However, information from frames 0 and 4 may be used when encoding or decoding frame 2, and therefore frame 4 can be encoded or decoded prior to frame 2. Access units 640, 650 for the remaining frames between 1 and 4 may follow, as shown.

Figures 7, 8:
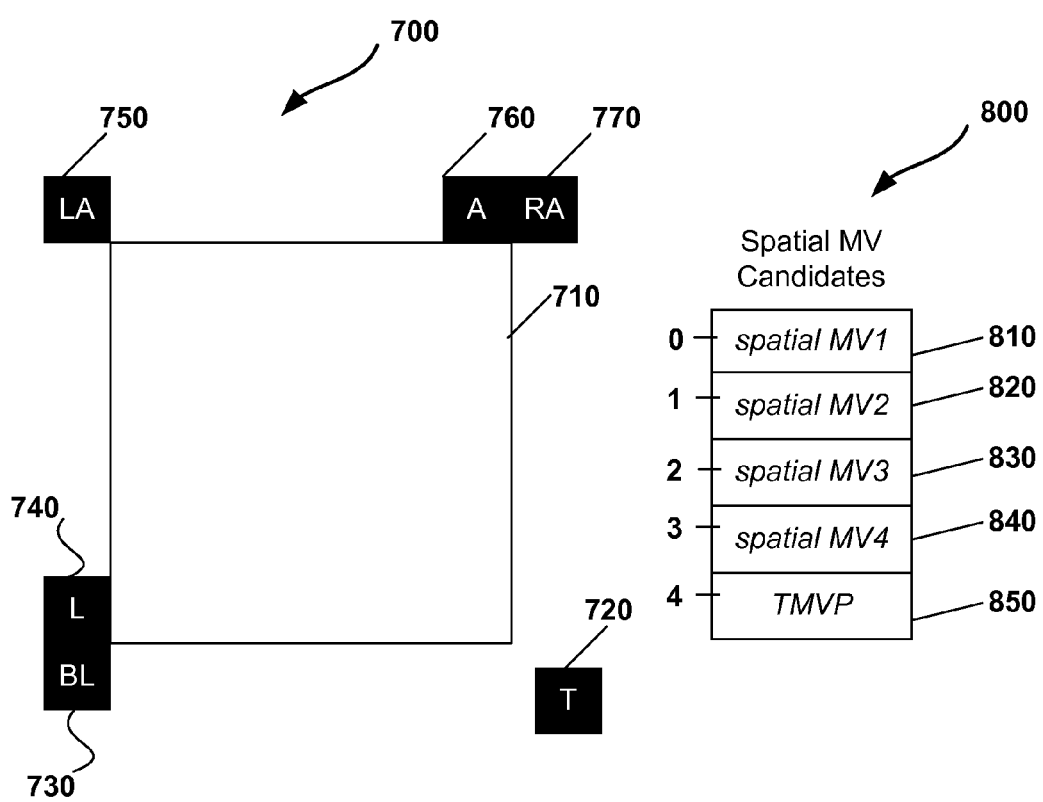
FIG. 7 is a conceptual diagram that illustrates example merge candidates.
FIG. 8 is an illustrative example of a merge motion vector (MV) candidate list.

As discussed above, during certain coding modes, a merge list of motion vector candidates may be generated and one or more of the motion vectors may be used to determine the value of a current video block. The motion vector candidates may include motion vector information from one or more spatially neighboring video blocks (e.g., below-left (BL 730), left (L 740), left-above (LA 750), above (A 760), and right-above (RA 770)) as well as one temporally neighboring, co-located video block (e.g., a temporal motion vector predictor, or TMVP (T 720)). These spatially neighboring video blocks 730, 740, 750, 760, 770 and the TMVP 720 are illustrated in FIG. 7. In some embodiments, the current video block 710 (e.g., the video block that is being coded) may inherit or otherwise use the motion information (e.g., motion vectors) of a selected neighboring video block. For example, as illustrated in FIG. 7, video encoder (such as video encoder 20) does not signal the motion vector itself for a video block 710 coded in merge mode. Rather, an index value (e.g., index values 0 to 4, as shown in FIG. 8) may be used to identify the neighboring video blocks (such as a bottom-left neighbor 730, left neighbor 740, left-above neighbor 750, above neighbor 760, or right-above neighbor 770) from which the current video block 410 inherits its motion vector and motion information.

In the merge mode, a merge motion vector (MV) candidate list is typically generated. One example of a merge motion candidate list 800 is illustrated in FIG. 8. In some embodiments, the merge candidate list size value N (e.g., the maximum number of list entries) of the merge candidate list may be signaled (e.g., at a slice header, etc.). According to the current version of the HEVC specification, a merge MV candidate list size cannot be greater than five. However, in some embodiments of this disclosure, the merge candidate list size N may be greater than five.

In some embodiments, a merge MV candidate list 800 may include one or more of the motion vectors of spatial neighbor blocks 730, 740, 750, 760, 770 and a temporally co-located block (e.g., TMVP) 720, as shown in FIG. 7. Four of the five spatial MV candidates and the temporal MV candidate are stored as entries 810, 820, 830, 840, 850 in a merge MV candidate list 800, as shown in FIG. 8.

FIG. 8 shows an illustrative example of a merge candidate list 800 (also called a merge MV candidate list or a MV candidate list 800) having five entries and up to four spatial motion vector candidates added to the merge candidate list (although in other embodiments, the candidate list may have more or less than five entries and have more or less than four spatial candidates added to the merge candidate list). Index values for the five entries in the merge candidate list 800 start at 0 and end at 4. The merge candidates may include spatial candidates, for example as defined in HEVC, and other types of candidates. As shown in FIG. 8, the TMVP 850 may be added after spatial candidates at the end of the list 800, and may have an index value of 4. Four other spatial motion vector candidates, if available (e.g., containing valid motion information), are added into the list 800: spatial MV1 810, which may have an index of 0; spatial MV2 820, which may have an index of 1; spatial MV3 830, which may have an index of 2; and spatial MV4 840, which may have an index of 3. Each spatial MV can be equal to or derived from any spatially neighboring video block (e.g., blocks 730, 740, 750, 760, 770) to the current video block (e.g., block 710). In some embodiments, if some merge candidates are not available, (or if they are pruned or otherwise removed from the list 800) other candidates can be added to the list. For example, spatial candidate from block 750 may be added. As another example, a candidate from a lower layer (e.g., a candidate from a base layer, where the current video block 710 is in the enhancement layer) can be added. In some embodiments, if some merge candidates are not available, the TMVP 850 may have an index less than 4.

Some merge candidates in the merge MV candidate list 800 may be compared with other merge candidates to determine if values have been duplicated. MV candidates can be removed from the merge MV candidate list 800 if the same MV is already present in the merge MV candidate list 800. This process may be referred to as pruning. For example, even if five MV candidates are added to the merge MV candidate list 800, after the pruning process, the total number of unique MV candidates could be smaller than five. In addition, the candidates are considered in a particular, predetermined order. If a candidate is not available (e.g., if it doesn't exist), it will not be added to the merge list. If it is available, the device will determine if it should be pruned. For example, if a value associated with the candidate under consideration is identical to the value of another candidate that is the closest neighbor to the candidate under consideration, the candidate under consideration will not be added to the merge list. Merge list pruning may be applied during or after merge list generation. If the total number of MV candidates after pruning is less than five, additional artificial candidates, based on the ones already inserted in the merge MV candidate list 800, may be generated to fill up the MV candidate list 800. As a result, a merge candidate list may be generated, and a video encoder (e.g., video encoder 20) may signal, in the encoded video bitstream, an index, corresponding to the selected MV candidates from the merge candidate list, in the bitstream to video decoder 30.

Therefore, according to HEVC, the order and conditions in which the MV candidates are considered and added to the merge list are:

1. Left MV candidate (L 740)
2. Above MV candidate (A 760)

3. Above right MV candidate (RA 770)
4. Bottom left MV candidate (BL 730)
5. Above left MV candidate (LA 750)
   a. added if number of candidates in the list is less than 4
6. TMVP (T 720)
   a. added if this candidate is used Therefore, inefficient merge list construction can result when the TMVP is not used. This inefficiency can result because the HEVC merge list is limited to only five entries and a space in the merge list is kept available for the TMVP, even when TMVP is not used. Therefore, even though HEVC allows up to five entries in the merge list, in some situations, one of the list entries can remain unused. The merge list of five candidates is used for illustrative purposes. Other numbers of candidates can also be used.

As described above, there are two modes for the prediction of motion parameters: Merge mode and AMVP mode. While the techniques of the present disclosure are described with respect to the two modes, this is not meant to be limiting as the techniques described herein can be applied to any type and number of modes used for the prediction of motion parameters.

In one implementation, BL motion information can be used as a candidate in Merge and AMVP candidate lists. For example, if BL motion information is available, the BL motion information can serve as a last candidate in Merge/AMVP lists. Alternatively, BL motion information can be added depending on spatial scalability. For example, the base layer motion vector (MV) is added to the end of the MV predictor list in spatial scalability case, and the base layer MV is put at the beginning of the MV predictor list for SNR scalability case. In yet another implementation, BL motion information can be inserted always as a first candidate into Merge/AMVP candidate lists with an optional pruning process as described in U.S. application No. 61/681,111 filed Aug. 8, 2012, which is incorporated herein in its entirety by reference. The other candidates in Merge and AMVP candidate lists can be reference blocks in the EL block (e.g., other than the current EL block) or in a temporally-located EL block.

However, in some cases it may not be desirable to use the BL motion information in the same way in both Merge and AMVP modes when performing enhancement layer coding. For example, when adding extensions to the existing HEVC framework, it may be desirable to make as few changes as possible. Designing an extension such that BL motion information is inserted as a first candidate in a Merge candidate list may not require many changes to the existing HEVC framework. However, designing an extension such that BL motion information is inserted as a first candidate in an AMVP candidate list may require several changes to the existing HEVC framework.

Accordingly, the present disclosure includes extensions that are designed so as to minimize the number of changes made to the HEVC framework while still using BL motion information for enhancement layer coding. In the following implementations, additional details are described in BL motion information usage for enhancement layer coding.

Base Layer Motion Information Used in Candidate List

As described above, in the first group of methods, BL motion information is inserted as a candidate into candidate list of Merge/AMVP modes. If necessary, a BL motion vector can be scaled according to the spatial resolution ratio of the BL and EL.

In yet another implementation to the methods described above, BL motion information can be inserted as a candidate into the Merge/AMVP candidate lists for EL, but the position or index of the BL motion vector candidate inside the candidate list for EL can be dependent on what mode is applied. For example, a BL motion vector candidate can be inserted as a first candidate for Merge mode and as a last candidate for the AMVP mode. As another example, a BL motion vector candidate can be inserted as a last candidate for Merge mode and as a first candidate for the AMVP mode. As another example, a BL motion vector candidate can be inserted as a first candidate for Merge mode and as a first candidate for the AMVP mode. As another example, a BL motion vector candidate can be inserted as a first candidate for Merge mode and not included as a candidate for the AMVP mode. As another example, a BL motion vector candidate may not be included as a candidate for Merge mode and can be included as a last candidate for the AMVP mode.

In yet another implementation, the BL motion information can be selectively used in forming a candidate list for EL for particular modes. For example, the BL motion information can be used as a candidate for Merge mode and not used as a candidate for AMVP mode, or vice-versa.

Figure 9:
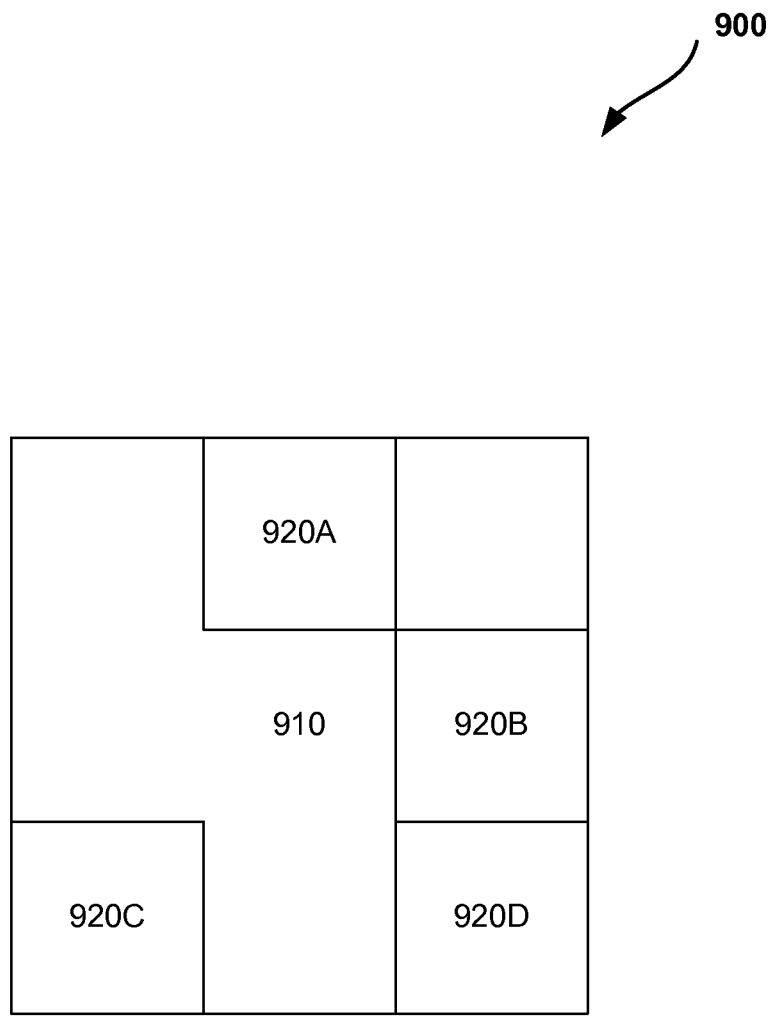
FIG. 9 illustrates possible locations of co-located BL blocks from which BL motion information can be taken.

The location of the co-located BL block from which the BL motion information is taken can be corners, centers, or other sub-blocks of the BL block, and the location can be dependent on certain conditions. FIG. 9 illustrates possible locations of co-located BL blocks from which BL motion information can be taken. As illustrated in FIG. 9, a base layer 900 includes a BL block 910. The co-located BL sub-block from which the BL motion information is taken can be any one of BL sub-blocks 920A-920D.

Generally, all methods described in U.S. application No. 61/657,572 filed Jun. 8, 2012, which is incorporated in its entirety herein by reference, are applicable to above use cases. In particular, methods of using a non-downsampled prediction mode are applicable to the use cases described above. For example, non-downsampled prediction mode information of a BL block can be obtained or received from memory. The non-downsampled prediction mode information of the BL block can include an intra-prediction mode of the BL block, motion information of the BL block, and other parameters that can be used to describe the behavior of the prediction modes of the BL block. At least one of an EL block or prediction mode information of the EL block can be predicted based on the non-downsampled prediction mode information of the BL block. The prediction mode information of the EL block can include an intra-prediction mode of the EL block, motion information of the EL block, or other parameters that can be used to describe the behavior of the prediction modes of the EL block. The non-downsampled prediction mode information of the BL block can be downsampled, for example, to generate information for predicting the BL block. In some embodiments, the non-downsampled prediction mode information of the BL block can be downsampled after predicting the at least one of the EL block or the prediction mode information of the EL block.

In other embodiments, a BL block other than the co-located BL block could be the BL block from which the BL motion information is taken. For example, a BL block that neighbors the co-located BL block could be the BL block from which the BL motion information is taken.

In some embodiments, an index of the BL motion vector candidate in Merge/AMVP candidates list can be dependent on the size of coding units (CUs), the size of prediction units (PUs), slice types, type or set of upsampling filters, modes of EL blocks that neighbor a current EL block, etc.

In some embodiments, usage of the BL motion information for certain modes can be dependent on the size of CUs, the size of PUs, slice types, type or set of upsampling filters, modes of EL blocks that neighbor a current EL block, etc.

Additionally or alternatively, a temporal motion vector prediction (TMVP) of the BL layer can serve as a motion candidate in the Merge/AMVP mode for EL prediction.

Figure 10:
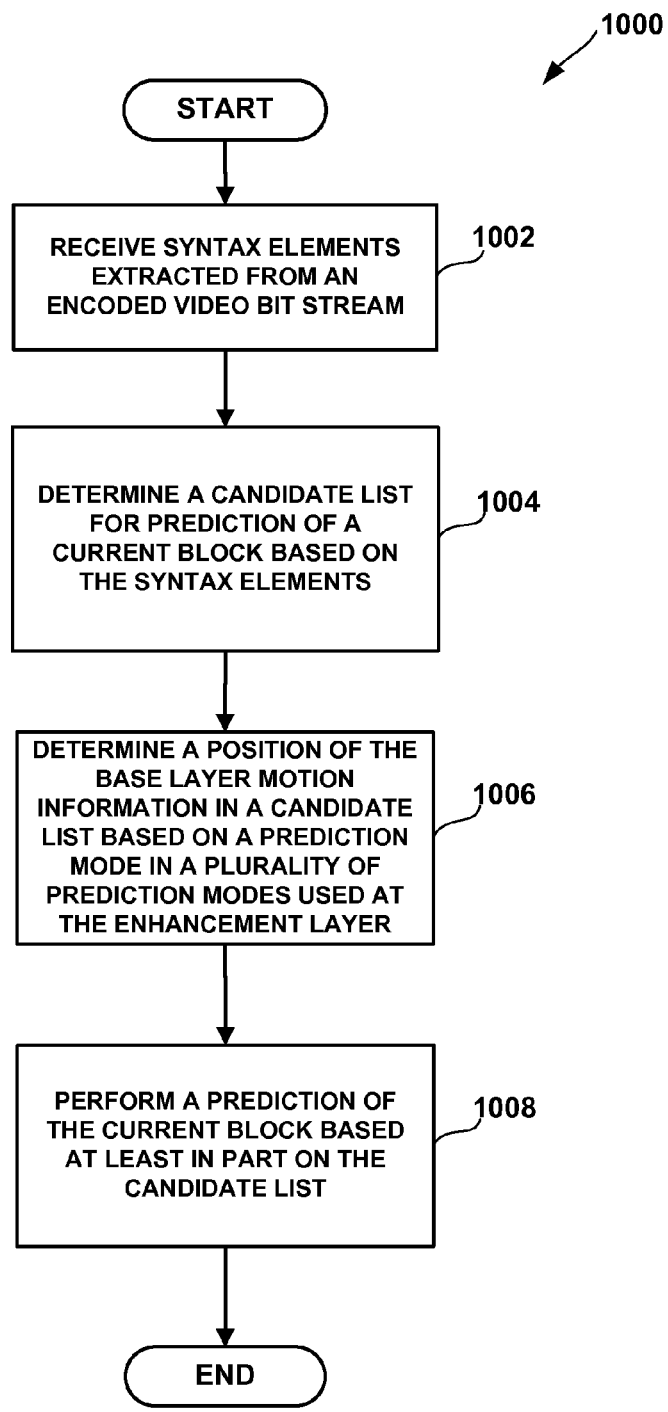
FIG. 10 illustrates an example method for decoding video data.

FIG. 10 illustrates an example method 1000 for decoding video data. The method 1000 can be performed by one or more components of video decoder 30, for example. For example, the method 1000 can be performed by the motion compensation unit 72 of the video decoder 30. In some embodiments, other components may be used to implement one or more of the steps described herein.

At block 1002, syntax elements extracted from an encoded video bit stream are received. At block 1004, a candidate list is determined for prediction of a current block based on the syntax elements. In an embodiment, the video data comprises a base layer and an enhancement layer. In a further embodiment, the enhancement layer comprises a current block. In a further embodiment, the base layer comprises a reference block and base layer motion information associated with the reference block.

At block 1006, a position of the base layer motion information in a candidate list is determined based on a prediction mode in a plurality of prediction modes used at the enhancement layer. At block 1008, a prediction of the current block is performed based at least in part on the candidate list.

Figure 11:
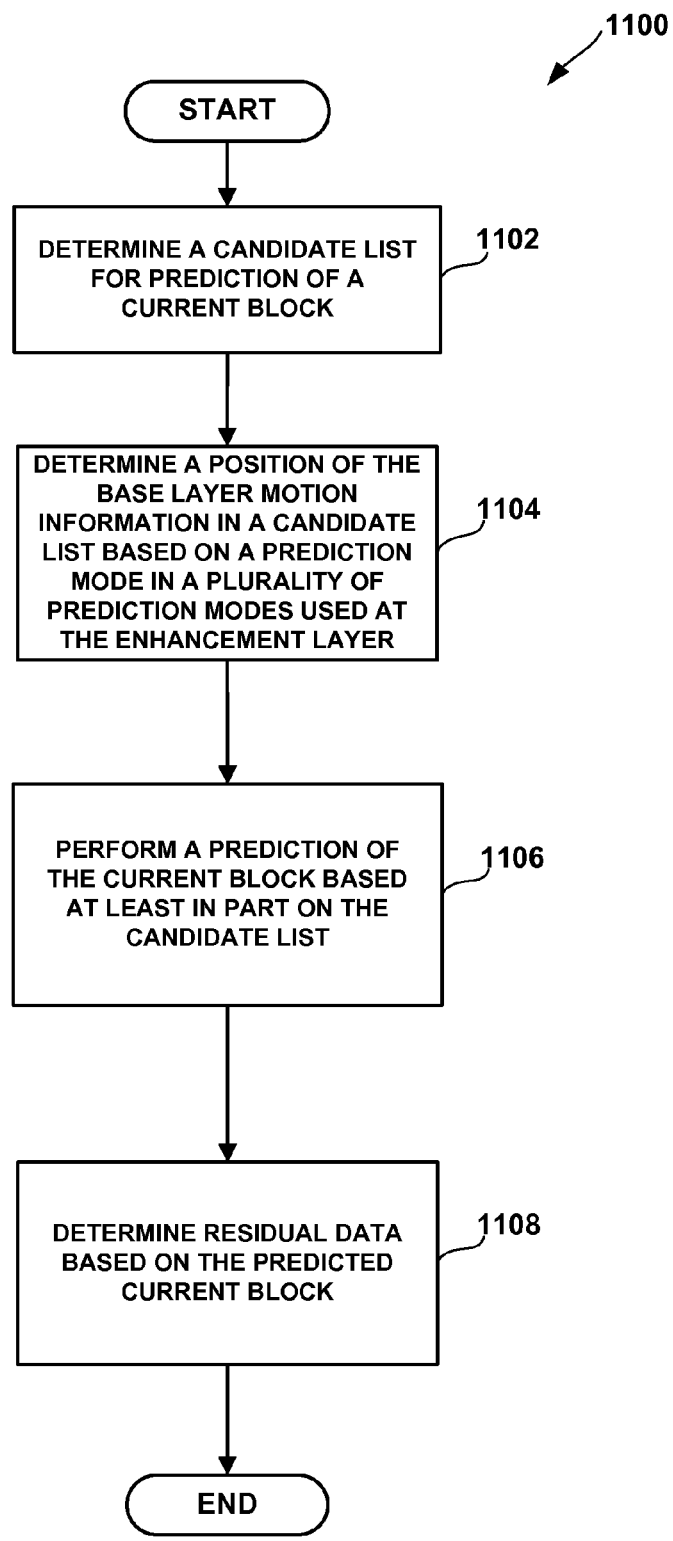
FIG. 11 illustrates an example method for encoding video data.

FIG. 11 illustrates an example method 1100 for encoding video data. The method 1100 can be performed by one or more components of video encoder 20, for example. For example, the method 1100 can be performed by the motion estimation unit 42 of the video encoder 20. In some embodiments, other components may be used to implement one or more of the steps described herein.

At block 1102, a candidate list is determined for prediction of a current block. In an embodiment, the video data comprises a base layer and an enhancement layer. In a further embodiment, the enhancement layer comprises a current block. In a further embodiment, the base layer comprises a reference block and base layer motion information associated with the reference block.

At block 1104, a position of the base layer motion information in a candidate list is determined based on a prediction mode in a plurality of prediction modes used at the enhancement layer. At block 1106, a prediction of the current block is performed based at least in part on the candidate list. At block 1106, residual data based on the predicted current block is determined.

Merge List Construction without Temporal Motion Vector Predictor

As described above, inefficient merge list construction can result when the TMVP is not used. This inefficiency can result because the HEVC merge list is limited to only five entries and a space in the merge list is kept available for the TMVP, even when TMVP is not used. Therefore, even though HEVC allows up to five entries in the merge list, in some situations, one of the list entries can remain unused.

However, usage of the TMVP may be flagged in a sequence parameter set. In addition, even when the TMVP is enabled for a particular sequence, it can be enabled or disabled for each slice. Therefore, knowledge of whether the TMVP is going to be used can be used to determine whether to store an additional spatial motion vector candidate in the merge list instead of reserving a merge list entry for the TMVP. In other embodiments, these techniques can be applied when TMVP is not available. For example, TMVP is not available when a co-located block is intra coded.

In one embodiment, a merge list is constructed by removing all the conditions related to the availability or presence of the TMVP, for a layer or view, which is not a base layer of HEVC's Scalable Video Coding (SVC) extension or a base view of a of a multiview or 3DV extension.

In another embodiment, a merge list is constructed by removing all the conditions related to the number of candidates that are already present in the merge list. In this case, since the list length (e.g., the number of entries in the list) might exceed the maximum list size (e.g., five entries for HEVC), list truncation may be used to reduce the list size.

In other embodiments, these techniques are applied to any slice of any HEVC extension, or to any extension of any video codec. In other embodiments, these techniques are applied to single-layer, 2D video codec.

Merge List Construction for 2D Single-Layer Video

During HEVC merge list construction, one of the spatial MV candidates (e.g., the LA 750 MV candidate) is conditionally added to the merge list. However, if TMVP is not used and the number of candidates in the merge list is already equal to four, the fifth spatial MV candidate is not added. Instead, one artificial MV candidate will be added to the merge list. However, if the TMVP is not used, the fifth spatial MV candidate could be included in the merge list. Therefore, in one embodiment, the condition for adding the fifth spatial MV candidate to the merge list is modified such that merge list construction occurs in the follow manner:

1. Left MV candidate (L 740)
2. Above MV candidate (A 760)
3. Above right MV candidate (RA 770)
4. Bottom left MV candidate (BL 730)
5. Above left MV candidate (LA 750)
    a. added if number of candidates in the list is less than 4
    b. or added if TMVP (T 720) is not used
6. TMVP (T 720)
    a. added if this candidate is used Each candidate is considered in the order listed above. In one embodiment, if the candidate is available and not pruned (as discussed above) it is added to the list. The next candidate in the list is considered in a similar manner. The fifth (LA 750) and sixth (TMVP T 720) candidates are considered according to the additional conditions listed above (e.g., LA 750 is added to the list if the number of candidates in the list is less than four or if the TMVP T 720 is not used (e.g., if the flag discussed above indicates that TMVP T 720 is not used)).

Merge List Construction for HEVC Extensions

In an extension of HEVC, the motion vector (MV) candidate (e.g., a base layer MV candidate) from a slice that has a different layer_id than the current slice but in the same access unit may be inserted into the merge list. For example, in some cases, it is added as the first MV candidate in the merge list. If the maximum merge list size is five, the forth spatial MV candidate can be conditionally added to the merge list, in a similar manner to how the fifth spatial MV candidate is added to the merge list according to HEVC. In general, if the maximum merge list size is N, the N−1th spatial MV candidate can be conditionally added to the merge list, in a similar manner to how the fifth spatial MV candidate is added to the merge list according to HEVC. Therefore, in one embodiment, spatial MV candidates are added to the merge list in the follow manner:

1. Base layer MV candidate
2. Left MV candidate (L 740)
3. Above MV candidate (A 760)
4. Above right MV candidate (RA 770)
5. Bottom left MV candidate (BL 730)
    a. added if number of candidates in the list is less than 4

6. Above left MV candidate (LA 750)
   a. added if number of candidates in the list is less than 4
7. TMVP (T 720)
   a. if this candidate is used Each candidate is considered in the order listed above. In one embodiment, if the candidate is available and not pruned (as discussed above) it is added to the list. The next candidate in the list is considered in a similar manner. The fifth (BL 730), sixth (LA 750), and seventh (TMVP T 720) candidates are considered according to the additional conditions listed above.

If the TMVP is not used, the fourth spatial candidate (e.g., BL) can also be included in the merge list. Therefore, in one embodiment, merge list construction occurs in the following manner:
1. Base layer MV candidate
2. Left MV candidate (L 740)
3. Above MV candidate (A 760)
4. Above right MV candidate (RA 770)
5. Bottom left MV candidate (BL 730)
   a. added if number of candidates in the list is less than 4
   b. or added if TMVP is not used
6. Above left MV candidate (LA 750)
   a. added if number of candidates in the list is less than 4
7. TMVP (T 720)
   a. if this candidate is used Each candidate is considered in the order listed above. In one embodiment, if the candidate is available and not pruned (as discussed above) it is added to the list. The next candidate in the list is considered in a similar manner. The fifth (BL 730), sixth (LA 750), and seventh (TMVP T 720) candidates are considered according to the additional conditions listed above.

In another embodiment, the merge list construction can occur in a manner that combines techniques described above. For example, in one embodiment, merge list construction occurs in the following manner:
1. Base layer MV candidate
2. Left MV candidate (L 740)
3. Above MV candidate (A 760)
4. Above right MV candidate (RA 770)
5. Bottom left MV candidate (BL 730)
   a. added if number of candidates in the list is less than 4
   b. or added if TMVP is not used
6. Above left MV candidate (LA 750)
   a. added if number of candidates in the list is less than 4
   b. or added of TMVP is not used and number of candidates in the list is less than 5
7. TMVP (T 720)
   a. if this candidate is used Each candidate is considered in the order listed above. In one embodiment, if the candidate is available and not pruned (as discussed above) it is added to the list. The next candidate in the list is considered in a similar manner. The fifth (BL 730), sixth (LA 750), and seventh (TMVP T 720) candidates are considered according to the additional conditions listed above.

The conditions that the number of candidates in the merge list is less than 5 when TMVP is not used for the fifth spatial candidate (LA) and that the number of candidates in the merge list is less than 4 for the fourth spatial candidate (BL) is true under the HEVC standard. Therefore, this embodiment may be utilized with both single layer HEVC (as discussed above) and with extension to HEVC that include generating a motion vector candidate list, such as a merge list.

In yet another embodiment, merge list construction is further simplified by removing all conditions for including the spatial motion vector candidates in the merge list. Therefore, in one embodiment, merge list construction occurs in the following manner:
1. Base layer MV candidate
2. Left MV candidate (L 740)
3. Above MV candidate (A 760)
4. Above right MV candidate (RA 770)
5. Bottom left MV candidate (BL 730)
6. Above left MV candidate (LA 750)
7. TMVP (T 720)
   a. if this candidate is used Each candidate is considered in the order listed above. In one embodiment, if the candidate is available and not pruned (as discussed above) it is added to the list. The next candidate in the list is considered in a similar manner.

Methods described herein are also applicable if the maximum number of candidates in the merge list is different from five. For example, if the maximum number of candidates is N, the above-described third candidate would be the N−2 candidate and the above-described forth candidate would be the N−1 candidate. Therefore, each method describe above could be modified to check if the number of candidates in the list is less than N−1 instead of 4, and less than N instead of 5, where so indicated.

In some embodiments, spatial MV candidates are considered in different orders. For example, the methods need not consider the spatial candidates in the L-A-RA-BL-LA order discussed above.

In another embodiment, a base layer MV candidate can be inserted as candidate number M, wherein M is in the range of 0 to N, inclusive. For example, the base layer MV candidate need not be added to the list at the first position, or considered as the first entry. It can be added to the list at any position.

If several MVs from a different layer or multiple different layers are added to the merge list, similar conditions can be added to the first, second and third spatial MV candidates.

As discussed above, although the above methods have been described with respect to a merge mode (e.g., by creation of a merge list), this is just an illustrative example. The same techniques can be used in AMVP mode, as well. For example, spatial condition removing in candidate list forming can be applied in AMVP mode, as well. The methods described above may be implemented in a video encoder or a video decoder. For example, in one embodiment, a motion estimation module or a motion compensation module of an encoder or a decoder may be configured to implement any one or more of the methods described above.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware. Various examples have been described. These and other examples are within the scope of the following claims.

What is claimed is:

1. An apparatus configured to code video data, the apparatus comprising:
   a memory configured to store video data associated with a base layer and an enhancement layer, wherein the base layer comprises a reference block and base layer motion information associated with the reference block, and wherein the enhancement layer comprises a current block; and
   a processor operationally coupled to the memory and configured to:
      determine a position of the base layer motion information in a candidate list based on a prediction mode in a plurality of prediction modes used at the enhancement layer, wherein the candidate list comprises one of a merge candidate list or an advanced motion vector prediction (AMVP) candidate list for inter-layer motion vector prediction, and wherein the base layer motion information is one of a first candidate in the merge candidate list or a last candidate in the AMVP candidate list;
      perform a prediction of the current block based at least in part on the candidate list to determine a predicted current block;
      decode an encoded video bit stream to determine transform coefficients;
      inverse transform the transform coefficients to determine a residual value of the current block; and
      determine a reconstructed version of the current block based on the residual value and the predicted current block.

2. The apparatus of claim 1, wherein the processor is further configured to selectively use the base layer motion information in forming an order in the candidate list.

3. The apparatus of claim 1, wherein the processor is further configured to selectively use the base layer information in forming the candidate list based on the prediction mode in the plurality of prediction modes used at the enhancement layer.

4. The apparatus of claim 1, wherein the memory unit is further configured to store video data associated with a plurality of spatially neighboring video blocks with respect to the current block and optionally at least one temporally neighboring video block with respect to the current block, and wherein the processor is further configured to:
   obtain a flag that indicates whether the temporally neighboring video block is used to code the current block; and
   include at least one of the spatially neighboring video blocks in the candidate list in response to the flag indicating that the temporally neighboring video block is not used.

5. A method for decoding video data, the method comprising:
   receiving syntax elements extracted from an encoded video bit stream;
   determining a candidate list for prediction of a current block based on the syntax elements, wherein the video data comprises a base layer and an enhancement layer, and wherein the enhancement layer comprises a current block, wherein the base layer comprises a reference block and base layer motion information associated with the reference block;
   determining a position of the base layer motion information in the candidate list based on a prediction mode in a plurality of prediction modes used at the enhancement layer, wherein the candidate list comprises one of a merge candidate list or an advanced motion vector prediction (AMVP) candidate list for inter-layer motion vector prediction, and wherein the base layer motion information is one of a first candidate in the merge candidate list or a last candidate in the AMVP candidate list; and performing a prediction of the current block based at least in part on the candidate list to determine a predicted current block.

6. The method of claim 5, further comprising generating an order in the candidate list based on a selective use of the base layer motion information.

7. The method of claim 5, further comprising generating the candidate list based on a selective use of the base layer information and based on the prediction mode in the plurality of prediction modes used at the enhancement layer.

8. The method of claim 5, further comprising:
decoding the encoded video bit stream to determine transform coefficients;
inverse transforming the transform coefficients to determine a residual value of the current block; and
determining a reconstructed version of the current block based on the residual value and the predicted current block.

9. The method of claim 5, wherein the video data comprises a plurality of spatially neighboring video blocks with respect to the current block and optionally at least one temporally neighboring video block with respect to the current block, the method further comprising:
obtaining a flag that indicates whether the temporally neighboring video block is used to decode the current block; and
including at least one of the spatially neighboring video blocks in the candidate list in response to the flag indicating that the temporally neighboring video block is not used.

10. A non-transitory computer-readable medium having stored thereon code that, when executed, causes an apparatus to:
determine a candidate list for prediction of a current block, wherein the video data comprises a base layer and an enhancement layer, wherein the enhancement layer comprises a current block, and wherein the base layer comprises a reference block and base layer motion information associated with the reference block;
determine a position of the base layer motion information in a candidate list based on a prediction mode in a plurality of prediction modes used at the enhancement layer, wherein the candidate list comprises one of a merge candidate list or an advanced motion vector prediction (AMVP) candidate list for inter-layer motion vector prediction, and wherein the base layer motion information is one of a first candidate in the merge candidate list or a last candidate in the AMVP candidate list; and
perform a prediction of the current block based at least in part on the candidate list.

11. The medium of claim 10, further comprising code that, when executed, causes an apparatus to generate an order in the candidate list based on a selective use of the base layer motion information.

12. The medium of claim 10, further comprising code that, when executed, causes an apparatus to generate the candidate list based on a selective use of the base layer information and based on the prediction mode in the plurality of prediction modes used at the enhancement layer.

13. The medium of claim 10, wherein the video data comprises a plurality of spatially neighboring video blocks with respect to the current block and optionally at least one temporally neighboring video block with respect to the current block, further comprising code that, when executed, causes an apparatus to:
obtain a flag that indicates whether the temporally neighboring video block is used to encode the current block; and
include at least one of the spatially neighboring video blocks in the candidate list in response to the flag indicating that the temporally neighboring video block is not used.

14. A video coding device that codes video data, the video coding device comprising:
means for determining a candidate list for prediction of a current block, wherein the video data comprises a base layer and an enhancement layer, wherein the enhancement layer comprises a current block, and wherein the base layer comprises a reference block and base layer motion information associated with the reference block;
means for determining a position of the base layer motion information in a candidate list based on a prediction mode in a plurality of prediction modes used at the enhancement layer, wherein the candidate list comprises one of a merge candidate list or an advanced motion vector prediction (AMVP) candidate list for inter-layer motion vector prediction, and wherein the base layer motion information is one of a first candidate in the merge candidate list or a last candidate in the AMVP candidate list; and
means for performing a prediction of the current block based at least in part on the candidate list.

* * * * *